United States Patent
Wykle

(10) Patent No.: US 8,336,851 B2
(45) Date of Patent: Dec. 25, 2012

(54) GAS PRESSURE REGULATOR WITH INTEGRATED REMOTE DISCONNECT

(75) Inventor: Christopher J. Wykle, Burlington, KY (US)

(73) Assignee: Itron, Inc., Liberty Lake, WA (US)

( * ) Notice: Subject to any disclaimer, the term of this patent is extended or adjusted under 35 U.S.C. 154(b) by 319 days.

(21) Appl. No.: 12/704,262

(22) Filed: Feb. 11, 2010

(65) Prior Publication Data

US 2011/0192999 A1 Aug. 11, 2011

(51) Int. Cl.
*F16K 31/02* (2006.01)
(52) U.S. Cl. ............... 251/129.04; 137/495; 137/505.46
(58) Field of Classification Search ............... 137/495, 137/505.46, 505.47; 251/129.04, 14
See application file for complete search history.

(56) References Cited

U.S. PATENT DOCUMENTS

| | | | | |
|---|---|---|---|---|
| 2,219,441 A | * | 10/1940 | Carnes | 137/505.46 |
| 3,856,042 A | * | 12/1974 | Fletcher et al. | 137/505.42 |
| 4,043,350 A | * | 8/1977 | Ichimi et al. | 137/495 |
| 4,265,270 A | * | 5/1981 | Satoh | 137/495 |
| 6,994,309 B2 | | 2/2006 | Fernández-Sein | |
| 7,228,726 B2 | * | 6/2007 | Kates | 73/40 |
| 2008/0257418 A1 | | 10/2008 | Kranz et al. | |
| 2008/0290986 A1 | | 11/2008 | Laughlin-Parker et al. | |
| 2008/0302172 A1 | | 12/2008 | Kates | |
| 2010/0023172 A1 | | 1/2010 | Malinowski | |

OTHER PUBLICATIONS

PCT International Search Report for PCT International Application No. PCT/US2011/022385 dated Mar. 23, 2011.
PCT Written Opinion of the International Searching Authority for PCT International Application No. PCT/US2011/022385 dated Mar. 23, 2011.

* cited by examiner

*Primary Examiner* — Eric Keasel
(74) *Attorney, Agent, or Firm* — Dority & Manning, P.A.

(57) ABSTRACT

Disclosed are apparatus and methodology for remotely shutting off gas flow at a consumer location. A gas pressure regulator is configured to respond to communication signals from a central facility via a communications infrastructure to override normal pressure regulation functions such that the gas pressure regulator outlet pressure is reduced to zero.

6 Claims, 1 Drawing Sheet

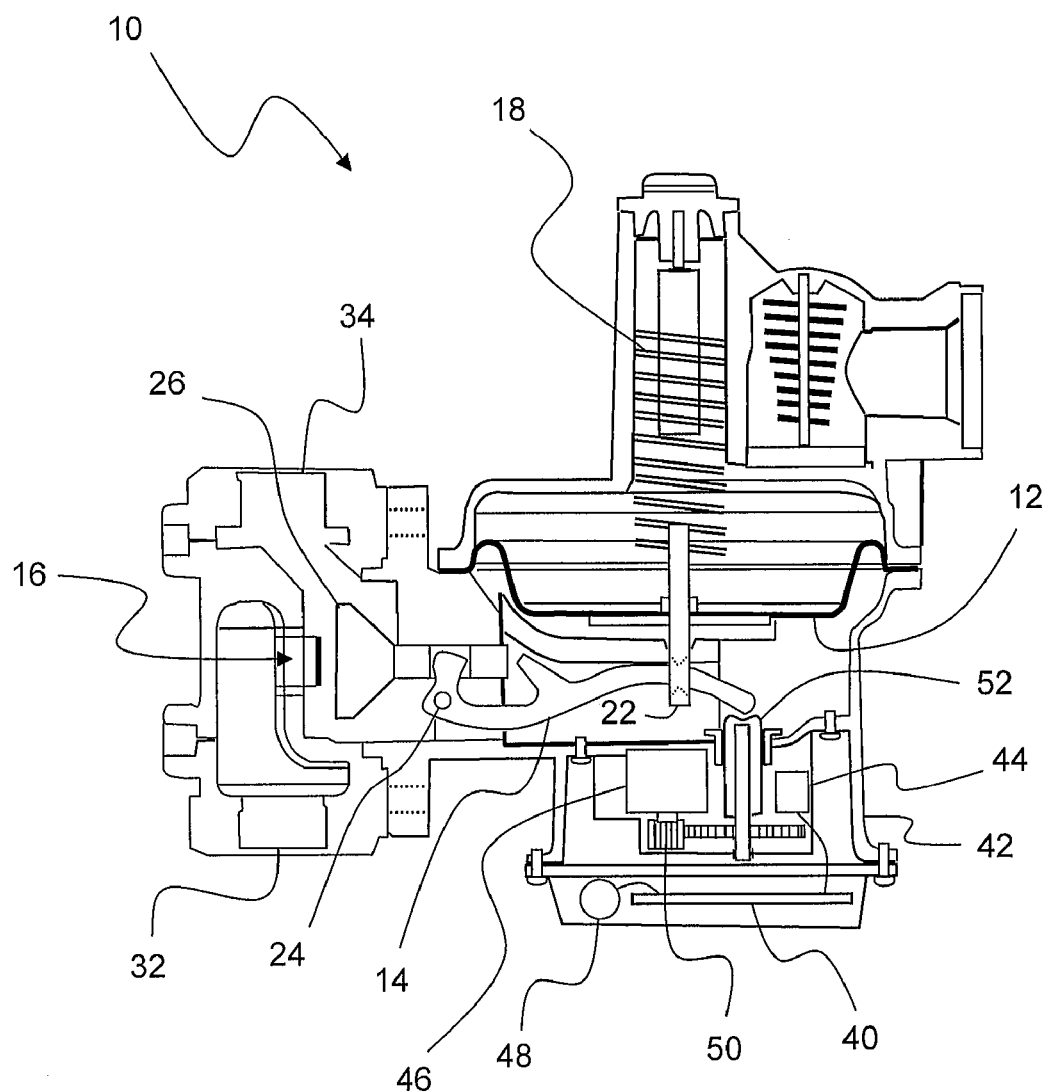

GAS PRESSURE REGULATOR WITH INTEGRATED REMOTE DISCONNECT

FIELD OF THE INVENTION

The present subject mater relates to gas flow control. More particularly, the present subject matter relates to gas pressure regulators with integrated remote disconnect capabilities.

BACKGROUND OF THE INVENTION

Disconnection of gas flow to a residential or business location may be desired for many reasons. In previous circumstances, disconnection of service typically required at least a visit to the service location and, in many instances, particularly involving residential location access to such residence. Depending on the reason for the disconnection, required access might be made more difficult by a resident, such as if the resident were away or the disconnect was for lack of payment of services by the resident/customer. In other instances, disconnection of services may be deemed necessary for customer safety or if a user requires a physical disconnection of gas flow given a standing company policy.

Previous gas cutoff devices have been provided involving pneumatically controlled gate valves and thermally activated valves that are initiated with handheld RF devices. Use of either of such types of devices typically requires a visit to the location, and in the case of the thermally activated vales, a replacement of components to reestablish gas flow.

Some gas shut off solutions have involved the use of short-range wireless control of separately installed gas valves. Such type of installation alleviates certain problems such as that of having physical assess to a residence, but still requires a visit to the location to effect disconnection.

While various implementations of gas disconnection systems have been developed, and while various combinations of remote valve control have been offered, no design has emerged that generally encompasses all of the desired characteristics as hereafter presented in accordance with the subject technology.

SUMMARY OF THE INVENTION

In view of the recognized features encountered in the prior art and addressed by the present subject matter, improved method and apparatus for controlling gas flow to a location have been provided.

In an exemplary configuration, an existing gas flow controlling device has been configured to provide remote control of a gas supply.

In one of its simpler forms, a gas pressure regulator has been enhanced to provide shut off capabilities by taking advantage of operational characteristics of the pressure regulator.

Another positive aspect of the present subject matter is that remote disconnection of service may be effected from a central location without requiring a personnel intensive drive by event or closer visit to a service location.

In accordance with aspects of certain embodiments of the present subject matter, methodologies are provided to enable shut off control of a gas service making use of established or otherwise existing communications infrastructure.

In accordance with certain aspects of other embodiments of the present subject matter, methodologies have been developed to enable overriding a normal operation of a gas pressure regulator to provide a new gas shut off capability.

In accordance with yet additional aspects of further embodiments of the present subject matter, apparatus and accompanying methodologies have been developed to enable gas pressure regulation and flow control without requiring insertion of multiple devices in a gas line.

One present exemplary embodiment relates to a remote disconnect enabled gas pressure regulator, comprising a pressure sensing element; an orifice positioned between a gas inlet and a gas outlet; a valve seat configured to be controllably spaced from such orifice; a control lever having a first end coupled to such sensing element and a second end coupled to such valve seat; an electrically controllable valve or external control, which is configured to cause pressure to be applied to such first end of such control lever; and an encoding-receiver-transmitter (ERT) module. Preferably, such module is configured to receive a transmitted command and to activate such electrically controllable valve or external control, so that activation of such electrically controllable valve or external control causes such control lever to positively seat such valve seat against such orifice.

In some further embodiments and variations of such pressure regulator, a plunger may be coupled to such electrically controllable valve such that activation of such electrically controllable valve causes such plunger to apply pressure to such control lever. In some alternatives, such electrically controllable valve may include an electric motor. Still further optionally, in some embodiments a pinion gear may be coupled to such motor; and a gear train coupled to such plunger, so that activation of such motor produces rotation of such pinion gear and movement of such gear train to produce pressure by such plunger upon such control lever.

Another present exemplary embodiment relates to a method for operating a gas pressure regulator having an inlet and an outlet. Such method may include sensing outlet pressure; controlling outlet pressure based on the sensed outlet pressure; monitoring a communications infrastructure; and overriding control of the outlet pressure control to reduce outlet pressure to zero upon receipt of commands to cut off gas flow between the inlet and the outlet of the pressure regulator.

In variations of the foregoing methodology, such monitoring may include integrating an encoding-receiver-transmitter (ERT) module within the gas pressure regulator; and monitoring a communications infrastructure for command instructions. In still other present variations, such controlling may include providing an orifice and valve seat between the inlet and outlet; and controlling spacing between the orifice and the valve seat. Further, overriding may include forcing the spacing between the orifice and valve seat to zero.

Yet another present exemplary embodiment relates to an automatic meter reading (AMR) infrastructure having a central control facility and a communications infrastructure. Such infrastructure preferably is operative with a presently disclosed gas pressure regulator, comprising a gas pressure controlling valve; an electrically controllable valve; and an encoding-receiver-transmitter (ERT) module configured to receive a command from the central control facility to activate such electrically controllable valve. Per such arrangement, such electrically controllable valve is configured to override operation of such gas pressure controlling valve.

In some present alternatives, such gas pressure regulator may further include a gas inlet positioned upstream of such gas pressure controlling valve; a gas outlet positioned downstream of such gas pressure controlling valve; a gas pressure sensor responsive to gas pressure at such gas outlet and configured to apply mechanical pressure to such gas pressure controlling valve; and a mechanical pressure producing override device coupled to such electrically controllable valve and configured to apply mechanical pressure to such gas pressure controlling valve.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended FIGURE, in which:

FIG. 1 illustrates an exemplary combination gas pressure regulator with an integrated remotely operable disconnect capability constructed in accordance with present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved apparatus and methodology for controlling gas flow to a location.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject gas pressure regulator with integrated remote disconnect. Referring now to the drawing, FIG. 1 illustrates an exemplary combination gas pressure regulator with an integrated remotely operable disconnect capability constructed in accordance with present subject matter.

With reference to FIG. 1, the basic operation of a pressure regulator generally 10 is a well understood technology that is used to control the flow and pressure of a supplied gas. In an exemplary configuration, the gas pressure regulator component used in combination with the present subject matter may correspond in general to a Model B42 gas pressure regulator manufactured by Itron, Inc., the owner of the present subject matter.

The presently combined features of present exemplary pressure regulator 10 comprise four main elements: sensing element (diaphragm) 12, control lever 14, restricting orifice 16, and loading spring 18. One end of lever 14 passes through an opening in a first end of operator rod 22 while the other end of operator rod 22 is coupled to diaphragm 12. Lever 14 is mounted on pivot 24 such that up and down motion of lever 14 results in side-to-side or lateral motion of valve seat 26. Those of ordinary skill in the art will appreciate that such respective motions are stated in relative terms, and that movement descriptions in absolute terms depends on the orientation of pressure regulator 10 in a given embodiment or installation.

As also understood by those of ordinary skill in the art, during normal pressure regulation operation, movement of diaphragm 12 from outlet pressure gas in opposition to the spring force of loading spring 18 results in lateral displacement of valve seat 26 toward and away from orifice 16. Such results in a regulated gas pressure at gas outlet 34 as the gas from gas inlet 32 passes through orifice 16.

In accordance with present technology, an encoder-receiver-transmitter (ERT) module generally 40 is mounted within housing 42 coupled to pressure regulator 10. ERT 40 is coupled to a valve controlling printed circuit board (PCB) 44 that, in turn, is connected by a wired connection to a representative exemplary control valve or external control 46. ERT 40 may be powered by battery 48 and is based on otherwise existing automatic meter reading (AMR) technology that permits bidirectional communication between remote devices and a central control system and/or mobile devices over known communications infrastructure, details of which form no particular aspects of the present subject matter.

In accordance with present subject matter, when gas shut-off is required, a control signal may be sent from a central facility via a communications infrastructure to ERT 40. ERT 40 receives the control signal and causes valve or external control 46 to actuate, which in turn causes control lever 14 to use pressure regulator 10's mechanical advantage to positively close the flow of gas through restricting orifice 16. As illustrated by the exemplary disclosure herewith, such may be accomplished by energizing valve or external control 46, which is illustrated for present example as a motor. Such motor rotates a pinion gear 50 and actuates an associated gear train, resulting in raising piston 52. An end portion of piston 52 contacts and applies mechanical pressure to one end of lever 14 causing valve seat 26 to close and seat firmly against orifice 16, thereby positively closing the flow of gas through orifice 16. Such operation in accordance with present subject matter otherwise overrides the normal operation of pressure regulator 10 to provide additional functionality, permitting it to operate as a remotely controllable gas cutoff device.

It will be appreciated by those of ordinary skill in the art that other force generating mechanisms may be used to force movement of the end of lever 14. For example, and without limitation, an electrically operated latching solenoid may be employed to apply pressure to the end of lever 14. Also, it is to be understood by those of ordinary skill in the art that the present subject matter encompasses embodiments wherein additional signals from the central facility may be used to instruct ERT 40 to again permit gas flow through pressure regulator 10 by reversing the operation of valve 46.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure and appended claims are not intended as precluding inclusion of such modifications, variations and/or additions to the present subject matter as would be readily apparent to one of ordinary skill in the art.

What is claimed is:

1. An integrated remote disconnect enabled gas pressure regulator, comprising:
    a pressure sensing element;
    an orifice positioned between a gas inlet and a gas outlet;
    a valve seat configured to be controllably spaced from said orifice;
    a control lever having a first end coupled to said sensing element and a second end coupled to said valve seat;
    an external control, directly electrically controllable and configured to cause pressure to be applied directly to said first end of said control lever; and
    an encoding-receiver-transmitter (ERT) module configured to receive a transmitted command and to activate said electrically controllable external control, so that activation of said electrically controllable external control causes said control lever to positively seat said valve seat against said orifice.

2. A pressure regulator as in claim 1, further comprising a plunger coupled to said electrically controllable external control such that activation of said electrically controllable external control causes said plunger to apply pressure to said control lever.

3. A pressure regulator as in claim 2, wherein said electrically controllable external control comprises an electric motor.

4. A pressure regulator as in claim 3, further comprising:
    a pinion gear coupled to said motor; and
    a gear train coupled to said plunger, so that activation of said motor produces rotation of said pinion gear and movement of said gear train to produce pressure by said plunger upon said control lever.

5. A pressure regulator as in claim 1, further comprising in combination:
    an automatic meter reading (AMR) infrastructure having a central control facility and a communications infrastructure;
    wherein said ERT module is configured to receive a command from said central control facility to activate said electrically controllable external control; and
    said electrically controllable external control is configured to override the position of said control lever.

6. A pressure regulator as in claim 1, wherein said pressure sensing element is responsive to gas pressure at said gas outlet and configured to apply mechanical pressure to said valve seat.

* * * * *